United States Patent [19]

Szenay et al.

[11] Patent Number: 5,031,779
[45] Date of Patent: Jul. 16, 1991

[54] COMPACT DISK STORAGE CAROUSEL

[76] Inventors: Joseph A. Szenay, 5990 Dellwood Ave., Shoreview, Minn. 55126; Jerome A. Szenay; Nicholas A. Szenay, both of 2057 Dale St., Roseville, Minn. 55113

[21] Appl. No.: 527,361

[22] Filed: May 23, 1990

[51] Int. Cl.$^5$ .............................................. A47F 7/00
[52] U.S. Cl. ........................................ 211/40; 211/41; 211/78; 211/163; 211/194; 312/11
[58] Field of Search .................. 211/163, 41, 40, 194, 211/144, 78; 312/11; 248/131, 425

[56] References Cited

U.S. PATENT DOCUMENTS

| | | | |
|---|---|---|---|
| 2,899,074 | 8/1959 | Gullixson | 211/40 |
| 3,170,741 | 2/1965 | Richards | 211/40 X |
| 3,608,739 | 9/1971 | Duboff | 211/40 |
| 4,014,437 | 3/1977 | Rumble et al. | 211/78 X |
| 4,126,366 | 11/1978 | Handler et al. | 211/163 X |
| 4,485,997 | 12/1984 | Potter | 211/163 X |
| 4,741,438 | 5/1988 | Mastronardo | 211/40 X |
| 4,802,587 | 2/1989 | Armijo et al. | 211/40 X |
| 4,826,261 | 5/1989 | Nademlejnsky | 312/11 |

Primary Examiner—Robert W. Gibson, Jr.
Attorney, Agent, or Firm—Haugen and Nikolai

[57] ABSTRACT

A carousel for storing and displaying compact disk albums or cases comprises one or more reels rotatably mounted on a turntable base where the reels include a central core and a pair of parallel spaced-apart disks having sets of parallel ribs disposed at equal angular positions around the core. The dimensions are such that the CD case readily fits between the pair of disks and are held upright by their engagement with the ribs formed on the disks. When a reel populated with a plurality of CD cases is placed on the base, it may be rotated so as to bring the cases into view for selection of a particular recording for play.

11 Claims, 3 Drawing Sheets

COMPACT DISK STORAGE CAROUSEL

BACKGROUND OF THE INVENTION

Field of the Invention

This invention relates generally to apparatus for organizing and storing compact disk (CD) recordings, and more particularly to a carousel system which is modular in nature and which can be used to store and display, for ease of selection, a large plurality of CD albums or cases in a relatively small space.

II. Discussion of the Prior Art

In the past several years so-called compact disks or CDs have, to a large extent, replaced the older phonograph records as the more popular means of recording audio programming. CDs are also coming into use for storing digital data as a computer input media. The CD itself comprises a plastic disk which has been metallized on each of its major surfaces and then audio information, such as music, voice, etc., is digitally encoded therein using laser technology. Such a CD may then be inserted into a CD player where the information is decoded and converted to analog form for playback through audio amplifier equipment.

In accordance with current standards, a CD is approximately 4¾ inches in diameter and has a thickness of about 1/16 inch. They are generally sold in a molded plastic container or case which also will typically include graphics and other artwork helpful in advertising and promoting the sale of the CD. The album or case comprises a standardized rectangular box measuring 5-9/16 inches long by 4⅛ inch high by 7/16 inch thick and formed as two pieces which are hinged together about a spine, allowing the box to be opened and closed about the CD which it is designed to protect.

When the number of CDs owned by an individual increases beyond a certain point, it is desirable to have some means for storing them while at the same time displaying the cases containing the CDs in such a way that they remain organized and readily viewable for selection of a particular recording. There are on the market small cabinets having drawers which may be slid in and out where those drawers are partitioned to contain the CD cases on edge therebetween. When selecting a particular piece of music for play, the owner must pull out the drawer and then view downward on the binding edge of the album box to read the identity of the various pieces. This drawer-type storage approach has the disadvantage of making it difficult to locate a particular selection, especially when plural cabinets are stacked relative to one another in a rack in which the CD player and other audio equipment are contained or, for that matter, even when such drawer cabinets are placed on a shelf.

It is accordingly a principal object of the present invention to provide a new and improved system for storing and displaying CD cases for facilitating the location and selection of a particular CD from a large plurality of CD cases.

Another object of the invention is to provide a system for organizing and containing CD cases which is modular in nature, allowing expansion of the storage capacity but without limiting one's view in a way which might hamper the ability to find a particular selection.

SUMMARY OF THE INVENTION

The foregoing features, objects and advantages of the invention are achieved by providing a base member including a rotatable carriage in the form of a spider which supports at least one reel assembly. The reel assembly, itself, comprises a vertically oriented central cylindrical core and a pair of parallel vertically spaced-apart circular disks, the flanges having a series of radially oriented ribs formed on the opposed faces thereof. The spacing between the disks is such that a CD case can be fitted between adjacent sets of parallel ribs on each whereby they are maintained in an upright orientation with the CD identifying graphics clearly visible. At the innermost end of these ribs are four serrations which mate with those found on all commercially available CD cases causing a friction fit. Being rotatable, the reel containing the CD cases can be turned as the identifying labels are brought into view by a person looking straight on. The reels are also designed so that two or more may be stacked in interlocking relationship allowing both to be rotatably supported on the base.

In its simplest form, then, the invention can be seen to comprise a carousel for storing and displaying compact disk cases and includes a base with at least one storage reel rotatably mounted on the base where the reel includes a means for supporting a plurality of compact disk cases, on edge, with a predetermined angular spacing between each such case.

DESCRIPTION OF THE DRAWINGS

The features, objects and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE PREFERRED EMBODIMENT

Figure 1:
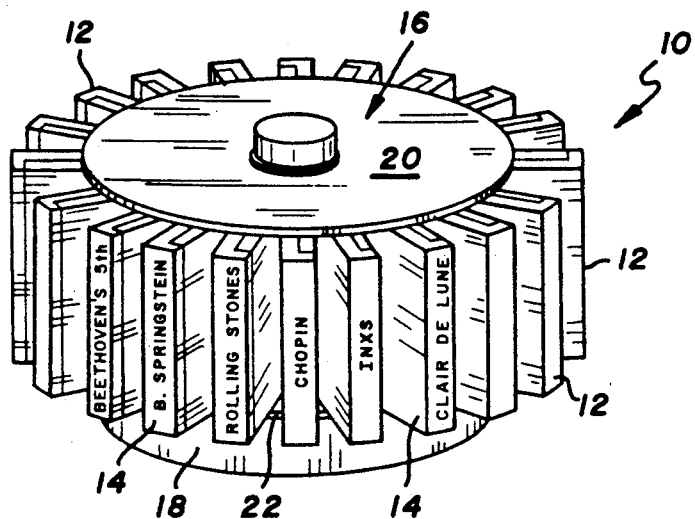
FIG. 1 is a perspective view of the CD storage carousel when populated with a plurality of CD cases.

Referring first to FIG. 1, there is indicated generally by numeral 10 a carousel arrangement for storing and displaying a plurality of compact disk cases. The cases are of standard size and construction and include first and second transparent molded plastic box halves which are hinged together along a rear spine 14 on which is generally located graphic/printing information identifying the album. The carousel comprises one or more reels 16 rotatably mounted upon a stationary base 18. The compact disk cases 12 stand on edge between two parallel, spaced-apart disks 20 and 22.

Figure 2:
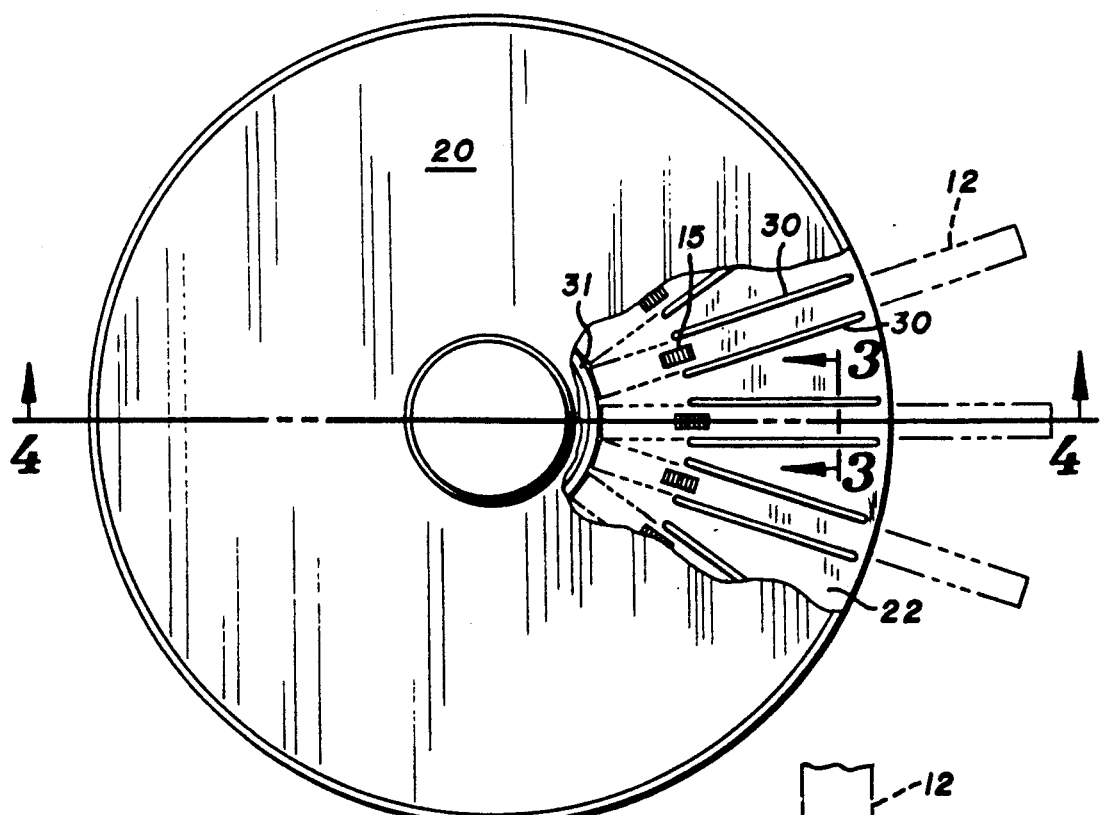
FIG. 2 is a top view of the assembly of FIG. 1 with a portion thereof broken away.
Figure 4:
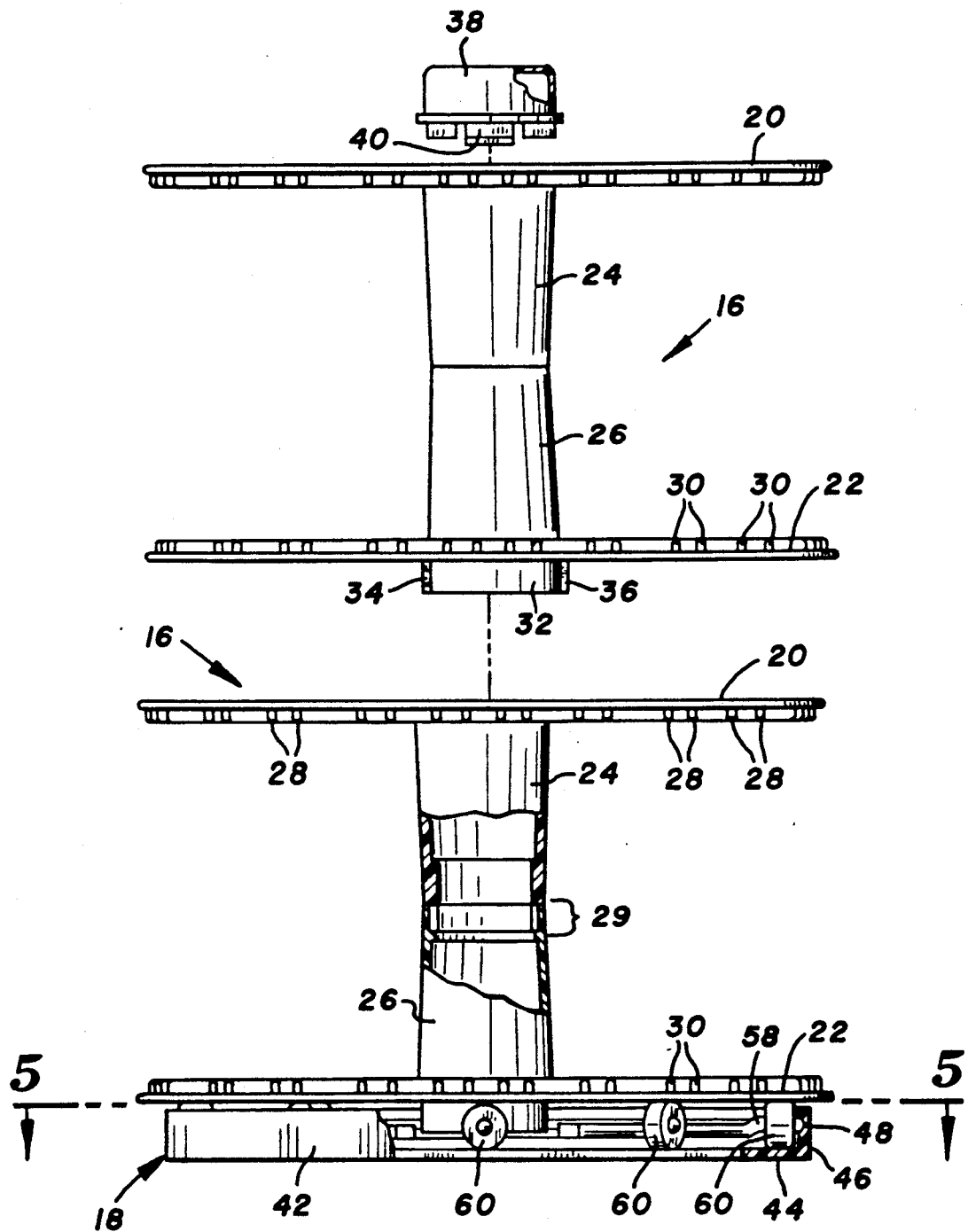
FIG. 4 is a side view in exploded form of two storage reels and with a portion thereof broken away to reveal otherwise hidden parts.

The exploded view of FIG. 4 better illustrates the configuration of the reel 16. Here it can be seen that the circular disks 20 and 22 include an integrally formed central core as at 24 and 26 which are designed to telescopingly snap fit together in the zone indicated by the bracket 29. Formed on the underside of the upper disk 20 and the upper side of the lower disk 22 are a plurality of pairs of parallel, spaced-apart ribs 28 and 30, at the end of which are four raised serrations 15 (FIG. 2) which mate with those in the CD case causing a friction fit. An integrally molded ring 31 (FIG. 2) projecting from the opposed surfaces of the disks and concentrically surrounding the core pieces 24 and 26 (FIG. 4) serves as a stop, thereby limiting the extent to which the CD cases can be inserted. This ensures that each CD case will extend outward the same radial distance for better aesthetic appearance and prevents the inner vertical edges of the CD cases from interfering from one another. The partially broken away view of FIG. 2 shows that the sets of parallel ribs are angularly spaced from one another about the circumference of the disks 20 and 22. Typically, the rib pairs may be spaced from one another at an angle of 18° such that 20 such pairs reside on the full circular surface of the disks.

The ribs comprising a given pair are spaced apart from one another by an amount which permits a compact disk case 12 to be inserted between them. Thus, with 20 such rib pairs, a given reel can store up to 20 compact disk cases.

It might also be mentioned at this point that when the cylindrical core segments 24 and 26 are joined together to form a reel, they are keyed together by a detent (not shown) such that the rib pairs on the upper circular disk 20 are vertically aligned with respect to the rib pairs on the lower disk 22.

Figure 3:
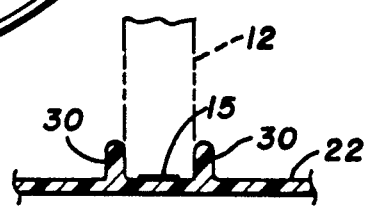
FIG. 3 is a cross-sectional view taken along the lines in FIG. 2.

With no limitation intended, and strictly for the purpose of illustration, the disks 20 and 22 may have a diameter of 11 inches and the distance between the disks 20 and 22 may be about 5 inches. Then, with ribs 28 projecting downward and ribs 30 projecting upward approximately 3/16th inch from the apposed disk surfaces, a compact disk case can readily be inserted between the two disks and held on edge by their engagement with the aligned sets of parallel ribs as best illustrated in FIGS. 1 through 3 of the drawings.

The exploded side elevation of FIG. 4 also reveals in the manner in which plural reels 16 may be coupled, one atop the other in stacked relation to increase the storage capacity of the system. Specifically, a portion of the core 26 extends below the bottom surface of the disk 22, the extending portion being identified by numeral 32. This portion is dimensioned to fit within the circular opening in the mating core portion 24 of the adjacent lower reel and integrally formed therewith are a pair of dimensioned detents 34 and 36, which give vertical alignment of up to three reels and also facilitates the turning of all three reels at one time. FIG. 4 also illustrates a decorative cap 38 having resilient barbs 40 which are designed to snap into openings formed through the side wall of core 24. This facilitates latching the cap to the top of the core of the uppermost reel member in the stack.

Figure 5:
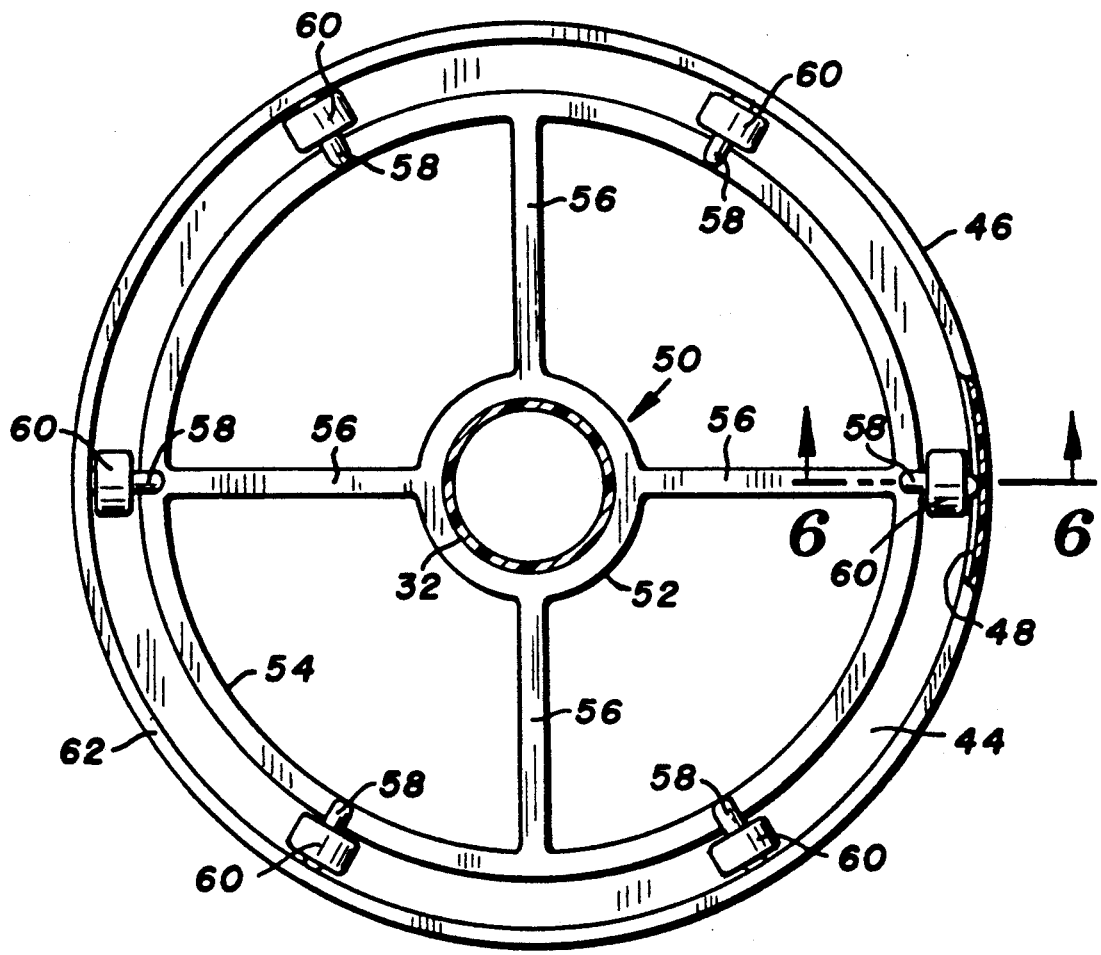
FIG. 5 is a cross-sectional view taken along the line 5—5 in FIG. 4.
Figure 6:
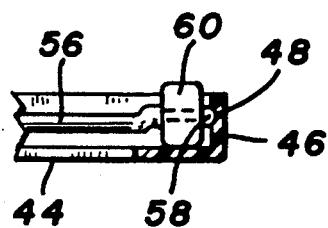
FIG. 6 is a partial cross-sectional view taken along the line 6—6 in F 5.

The base portion 18 of the carousel assembly of the present invention can best be observed in the views of FIGS. 4 through 6. It includes an annular tray 42 including a horizontally disposed segment 44 and an integrally-formed, upwardly projecting side wall 46 extending perpendicular to the segment 44. Formed inwardly into the side wall 46 is an arcuate groove 48, the purpose of which will be explained in greater detail below.

The base assembly also includes a carriage in the form of a spider 50 (FIG. 5) which includes a center hub 52 and an annular outer rim 54, the two being connected together by radial spokes, as at 56. Integrally molded to the rim 54 at equiangular locations are a plurality of radially extending axles 58, the outer ends of which are rounded and dimensioned to snap into and freely fit within the arcuate groove 48 formed in the wall 46 of the stationary tray 42. A wheel or roller 60 is fitted onto each of these axles. The rotatable wheels 60 are adapted to ride on the horizontal portion 44 of the annular tray 42 and the diameter of the wheels 60 is sufficient to provide a predetermined small clearance between the upper edge 62 of the base 18 and the lower surface of the disk 22 when the reel 16 is set onto the base with the downwardly projecting portion 32 of the core 26 centered within the hub 52 of the spider 50. In this fashion, as a tangential force is applied to the reel or reels, they are free to spin relative to the stationary base 18, thereby allowing the user to bring into view any one of the plurality of compact disk cases that might be stored in the reel or reels. All of the parts of the carousel can be molded from a suitable plastic, such as styrene or medium impact styrene.

This invention has been described herein in considerable detail in order to comply with the Patent Statutes and to provide those skilled in the art with the information needed to apply the novel principles and to construct and use such specialized components as are required. However, it is to be understood that the invention ca be carried out by specifically different equipment and devices, and that various modifications, both as to the equipment details and operating procedures, can be accomplished without departing from the scope of the invention itself.

What is claimed is:

1. A carousel for storing and displaying compact disk cases comprising:
   (a) a base including
      (1) a stationary circular tray,
      (2) a spider including an annular hub, a concentrically disposed annular rim surrounding said hub and a plurality of spokes forming said hub to said rim, and
      (3) a plurality of wheels journaled for rotation about axles secured to said rim and riding in said stationary circular tray; and
   (b) at least one storage reel rotatably mounted on said base, said storage reel including first and second circular disk members, each having an inner and an outer surface with means for joining said disk members together in parallel, vertically spaced-apart orientation relative to one another, and each including a plurality of pairs of parallel ribs projecting from said inner surfaces of said first and second circular disk members, the spacing between adjacent parallel ribs being slightly greater than the thickness of a compact disk case, and the spacing between said inner surfaces of said first and second circular disk members being slightly greater than the height dimension of said compact disk case with said pairs of parallel ribs maintaining said compact disk case mutually perpendicular to said first and second disk members.

2. The carousel as in claim 1 wherein said means for joining said first and second circular disk members comprises a generally cylindrical core concentrically disposed on each of said first and second circular disks and projecting perpendicularly from said inner surface thereof, said cores on said first and second disk members being joined to one another with the pairs of ribs on said first circular disk member vertically aligned with said pairs of ribs on said second circular disk member.

3. The carousel as in claim 1 and further including means for aligning plural ones of said storage reels together in stacked relation on said base.

4. The carousel as in claim 1 wherein said at least one storage reel rides on said plurality of wheels.

5. The carousel as in claim 2 wherein said first and second circular disk members each include annular stop means concentrically disposed about said core for limiting the extent that said compact disk cases can be radially inserted.

6. The carousel as in claim 2 wherein said cylindrical core is tubular and includes a portion extending a predetermined distance beyond said outer surface of said second disk member.

7. The carousel as in claim 6 wherein said portion of said tubular core extending beyond said outer surface of said second disk member fits concentrically within said annular hub of said spider.

8. The carousel as in claim 2 and further including a cap member attachable to one end of said cylindrical core on said reel members.

9. A carousel for storing and displaying a plurality of compact disk cases for ease of selection, comprising:
 (a) a stationary base member,
 (b) a carriage supported for rotation relative to said stationary base, said carriage including
  (i) a central hub,
  (ii) an outer rim concentrically disposed about said central hub,
  (iii) spokes joining said hub to said rim, and
  (iv) a plurality of wheels rotatably journaled to said rim at spaced apart locations; and
 (c) at least one storage reel attached to said carriage for rotation therewith, said storage reel including means for supporting a plurality of compact disk cases on edge with a predetermined angular spacing therebetween.

10. The carousel as in claim 9 and further including means for joining plural ones of said storage reels together in vertical stacked relation on said base.

11. The carousel as in claim 10 wherein said storage reel comprises:
 (a) first and second circular disk members, each having an inner and an outer surface with means for joining said disk members together in parallel, vertically spaced-apart orientation relative to one another, and each including a plurality of pairs of parallel ribs projecting from s id inner surfaces of said first and second circular disk members, the spacing between adjacent parallel ribs being slightly greater than the thickness of a compact disk case, and the spacing between said inner surfaces of said first and second circular disk members being slightly greater than the height dimension of said compact disk case with said pairs of parallel ribs maintaining said compact disk case mutually perpendicular to said first and second disk members.

* * * * *